This invention relates to an improvement in method and apparatus for the purification of exhaust gases from an internal combustion engine and more particularly relates to such an improvement employed with a catalytic exhaust purifier generally on an automobile or a truck.

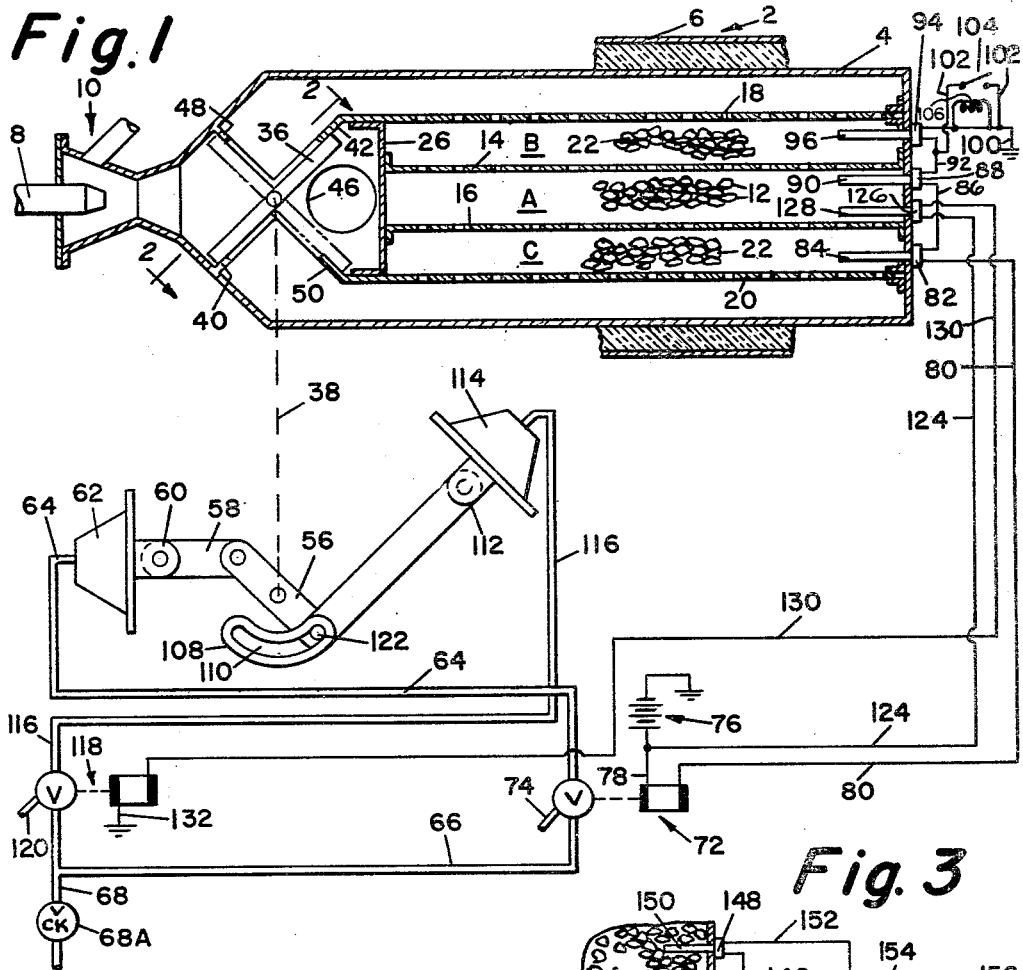
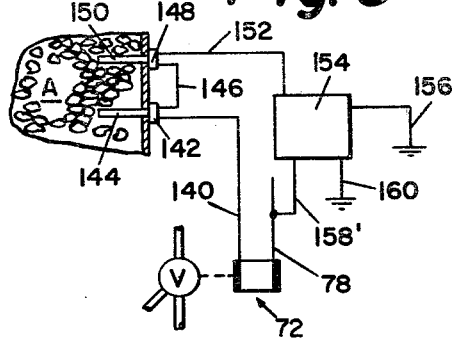
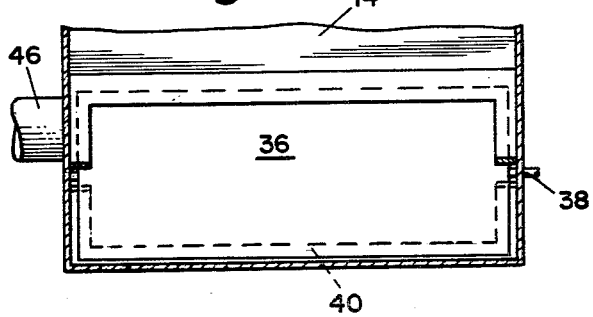
Fig. 1
Fig. 2
Fig. 3
INVENTORS
EUGENE J. HOUDRY
WILLIAM R. THOMAS
ATTORNEYS 3,189,417
APPARATUS FOR IMPROVING THE PURIFICATION OF EXHAUST GASES FROM AN INTERNAL COMBUSTION ENGINE
Eugene J. Houdry, Ardmore, and William R. Thomas, Paoli, Pa., assignors to Oxy-Catalyst, Inc., Berwyn, Pa., a corporation of Pennsylvania
Filed May 29, 1962, Ser. No. 198,507
2 Claims. (Cl. 23—288)

It is well known to employ an exhaust purifier containing an oxidation catalyst to purify exhaust gases from internal combustion engines operating on gasoline, generally leaded gasoline, to oxidize the oxidizable constituents of the exhaust gases and thus purify such gases. The oxidation catalyst is brought up to its operating temperature by the sensible heat of the exhaust gases which are discharged through the engine exhaust valves at an elevated temperature and are cooled in the exhaust system prior to reaching the exhaust purifier.

It has been found that the effective life of the catalyst conventionally used in catalytic exhaust purifiers can be extended substantially, for example, as much as 100% if the catalyst is maintained during most of its operating life within its most effective operating range, i.e. about 1100° F. and preferably in the range of from 1200° F. to 1900° F. It is important for the life of the catalyst to prevent, so far as possible, its operation below 1100° F. and above 1900° F. In the normal operation of a vehicle, the desired conditions are violated with substantial frequency, for example, when a car or truck is brought from near full power to idling conditions the mixture of air and exhaust gases passing through the catalyst may fall to 250° F. causing the catalyst temperature to drop below 1100° F. On the other hand, during periods of acceleration at relatively high speeds, particularly where high speed carburetor jets are cut in, the richness of the mixture passing through the catalyst bed frequently results in raising the level of the catalyst temperature above 1900° F. The method and apparatus in accordance with this invention is a marked improvement in maintaining the catalyst temperature within the desired range and hence in extending its life.

The invention will be made clear from a reading of the following description in conjunction with the drawings in which:

FIGURE 1 is a diagrammatic view of an exhaust purifier in accordance with the invention;

FIGURE 2 is a section, partially broken away, of the exhaust purifier of FIGURE 1 taken on the plane indicated by the lines 2—2 of FIGURE 1;

FIGURE 3 is a diagrammatic view of an alternative control for the control valve of the exhaust purifier of FIGURE 1.

Referring to FIGURE 1, an exhaust purifier 2 comprises a housing 4 having an insulated covering 6. Exhaust purifier 2 is supplied with exhaust gases from an internal combustion engine by exhaust gas line 8 which discharges into an air inspirator indicated at 10 which in turn discharges into the exhaust purifier. A bed of oxidation catalyst pellets 12 is confined between a pair of opposed grids 14 and 16 and identified as zone A. The rear ends of grids 14 and 16 are mounted on the housing 4 and the front end of the grids are mounted on a partition plate 26. These general features of the exhaust purifier are well known to the art. A grid 18 and a grid 20 respectively mounted on the housing and on partition 26 are employed to contain heat exchange material 22 exterior of grids 14 and 16, respectively in zones designated as "B" and "C." A valve 36 is fixedly secured to a shaft diagrammatically indicated at 38 in the position shown. The opposite sides of valve 36 abut against members 40 and 42, respectively, to cause the entering gases to be diverted upwardly so as to pass downwardly through grid 18, zones B, A and C, grid 20 and thence out of the exhaust purifier through exhaust pipe 46. When valve 36 is rotated to the position shown in dotted lines, it abuts against members 48 and 50 and acts to cause the entering gases to pass downwardly to grid 20, upwardly through grid 20, zones C, A and B, grid 18 and thence to exhaust pipe 46.

With valve 36 in the position shown in FIGURE 1, it is evident that after the catalyst bed is brought to its operating temperature by the sensible heat of the exhaust gases, a large amount of heat will be produced due to the oxidation of the exhaust gases. As the gases continue to flow downwardly through catalyst 12 in zone A, the sensible heat content of zone C will increase due to heat exchange with the oxidized gases with the sensible heat in zone C gradually increasing from the top of the zone to the lower portion of the zone. At the same time, when the position of the valve is reversed, the sensible heat in zone C will decrease due to the transfer of heat to the cooler entering gases. One the other hand, the sensible heat of zone B will gradually increase, the sensible heat of the lower portion of zone B increasing at a more rapid rate than the sensible heat in the upper portion of zone B. When the position of valve 36 is again reversed, zone B will give up heat to the cooler incoming gases and zone C will again store heat. It will be evident that through the use of this heat exchange arrangement, the incoming air exhaust gas mixture, particularly when it is at a very low temperature such as 250° F. at idling, will be heated so as to prevent excessive cooling down of the catalyst in zone A.

The catalyst pellets may be by way of example, a pellet of an activated metal oxide, preferably activated alumina, beryllia, thoria, magnesia or zirconia impregnated with metals or metal oxides having oxidation activity such as platinum, palladium, ruthenium, rhodium, copper, silver, chromium, vanadium, manganese iron or mixtures thereof such as copper and chromium oxides.

The pellets of heat exchange material in zones B and C may be any inert material. The inert material should desirably have a high capacity to store heat relative to its volume and should have good heat exchange characteristics with the gases flowing therethrough. Exemplary of such inert material are fused alumina, fused silica and fused aluminum silicate. If desired, an oxidation catalyst may be employed in zones B and C as the heat exchange material.

In general, it is desirable to have the pellets in the various zones in the range of from about 7 to 25 mesh, the depth of zone A should at least correspond to a minimum of eight layers of pellets, arbitrarily defining a "layer" as having a thickness equal to the minimum transverse direction of a pellet. From a practical standpoint, the depth of zone A may range from .25″ to 3″. Zones B and C each advantageously have a depth equal to from 25% to 200% of the depth of zone A. The horizontal cross-sectional area of each of the zones will generally be from 1 to 5 square inches per cubic inch of piston displacement with the geometric surface area of the catalyst pellets in zone A preferably ranging from 115 to 250 square inches per cubic inch of piston displacement.

Shaft 38 which rotates valve 36 is fixedly secured to a link 56 which in turn is pivotally connected to a link 58. Link 58 is pivotally connected to plunger 60 of pneumatic servo 62. Servo 62 is connected by lines 64, 66 and a line 68 to the intake manifold of the engine with which the exhaust purifier is being employed in order to supply vacuum to servo 62 for its operation. Line 68 is provided with a check valve 68a to prevent malfunctioning due to a temporary loss of vacuum in the intake manifold. The operation of servo 62 is controlled by solenoid valve 72 which alternately connects line 64 to line 66 to provide a vacuum or to line 74 to allow atmospheric pressure in line 64. The control mechanism for valve 72 includes the battery 76 which is connected by line 78 to solenoid valve 72. Solenoid valve 72 is connected by line 80 to thermal switch 82 which is provided with a sensing element 84 embedded in zone C. Line 86 connects switch 82 to thermal switch 88 which has a sensing element 90 embedded in zone A. Switch 88 is connected by line 92 to a thermal switch 94 which has a sensing element 96 embedded in zone C. Switch 94 is connected to ground through line 100. A holding circuit is provided by line 102 which is connected to line 100 and line 92 and contains a relay 104 having a coil 106 connected to line 100.

The by-pass action of valve 36 is controlled by a lever 108 having an arcuate opening 110 and being pivotally connected at one end to plunger 112 of pneumatic servo 114 which is connected by line 116 to a solenoid valve 118 which is connected to line 68 and to a line 120 leading to the atmosphere. The energization of solenoid valve 118 is controlled by line 124 which connects line 78 to thermal switch 126 and has a sensing element 128 embedded in the catalyst in zone A. The other side of switch 126 is connected by line 130 to solenoid valve 118 which in turn is connected to ground through line 132.

*Operation*

When the engine with which the exhaust purifier is being operated is started up the exhaust purifier will be at atmospheric temperature and switches 94 and 104 will be opened and switch 82 will be closed. In this position the spring of pneumatic servo 114 will urge lever 108 to the left as viewed in FIGURE 1 in the position shown permitting free motion of pin 122 which is fixedly secured to link 56 and rides in slot 110. The spring of pneumatic servo 62 will force lever 58 to the right as viewed in FIGURE 1 rotating link 56 clockwise to position valve 36 in the position shown in phantom in FIGURE 1 abutting members 48 and 50, so as to cause the incoming air exhaust gas mixture to flow upwardly through zones C, A and B respectively. As the catalyst becomes sufficiently heated by the sensible heat in the exhaust gases so as to commence the oxidation reaction, the temperature in zone A will rise to the desired operating range of from 1100° F. to 1900° F. The hot exhaust gases passing through zone B will heat the pellets contained therein and will eventually raise the temperature of the pellets in the upper portion of zone B containing sensing element 96 to the operating temperature of this switch which will preferably be in the range of from 300 to 800° F. When this operating temperature is reached, switch 94 closes which, since switches 88 and 82 are closed, completes the circuit of battery 76 through solenoid valve 72, lines 80, 86, 92 and 100 to ground. The energization of this circuit energizes coil 106 of holding relay 104 causing it to close and complete the circuit from line 92 to line 100 through line 102. When solenoid valve 72 is energized, it disconnects line 64 from the atmosphere and connects it to line 66 supplying a vacuum to actuate pneumatic servo 62. This moves lever 58 to the left as viewed in FIGURE 1 and in turn moves lever 56 to rotate shaft 38 counterclockwise to the position shown in FIGURE 1. In this position of valve 36, the air exhaust gas mixture is caused to flow downwardly through zones A, B and C, and thence out through exhaust pipe 46. This in turn results in a giving up of heat by the material in zone B to the incoming gases and a heating of the material in zone C by the gases passing from zone A through zone C. As the upper portion of zone B cools down due to the heat loss, the temperature will drop below the selected minimum in the range of 300 to 800° F. causing switch 94 to open. However holding circuit 104 will keep the circuit to ground complete. When the temperature in the lower portion of zone C reaches the predetermined temperature in the range of 300 to 800° F. for the operation of switch 82, this circuit will be opened, solenoid switch 72 will be deenergized to connect line 64 to the atmosphere, and the position of the valve 36 reversed by the spring of pneumatic servo 62 to the position shown in phantom in FIGURE 1 and the cycle is repeated.

In the event that the catalyst in zone A reaches a predetermined maximum temperature, for example 1900° F., switch 126 closes, energizes solenoid valve 118 which connects line 116 to vacuum line 68 and causes pneumatic servo 114 to move lever 108 upwardly in a position so as to limit the travel of pin 122 counterclockwise as viewed in FIGURE 1 so that the movement of valve 36 under the force of spring of servo 62 can move clockwise only far enough to bring it to a horizontal position. At substantially the same time, switch 88, which is preset to operate at the same temperature as switch 126, will open, causing the deenergization of the circuit controlling solenoid valve 72 if it is energized or keeping solenoid valve 72 deenergized if it was not energized. Thus the spring action of pneumatic servo 62 will move levers 58 and 56 until the pin 122 can move no further in slot 110 and valve 36 is substantially horizontal. This will cause the incoming air gas mixture to flow directly to and through exhaust pipe 46 without passing through the catalyst in the exhaust purifier which will result in the cooling down of the catalyst due to the substantial cessation of the oxidation of the exhaust gases.

Alternatively the operation of solenoid valve 72 and the position of valve 36 can be controlled during normal operations by a conventional timer switch which at periodic intervals opens and closes the control circuit. As shown in FIGURE 3, solenoid valve 72 which is connected to power line 78, is connected to line 140 which in turn is connected to thermal switch 142 having a sensing element 144 which is embedded in zone A of the catalyst bed illustrated in FIGURE 1. Line 146 connects the other side of switch 142 to thermal switch 148 which has a sensing element 150 also embedded in zone A of the purifier of FIGURE 1. The other side of switch 148 is connected to a line 152 which in turn is connected to a timer switch 154 which may, for example, be set to open and close at intervals in the range of from about 20 to 60 seconds. A line 156 completes the circuit from timer switch 154 to ground. Timer switch 154 is of the electrically operated type and is supplied by line 158 which is connected to power line 78 and the timer operating mechanism is connected to ground by a line 160. In operation the timer switch 154 will operate continuously while the engine with which the exhaust purifier is associated is operating. When the temperature of zone A reaches a satisfactory operating temperature of the catalyst, for example 1100° F., thermal switch 142 closes making a complete circuit from solenoid valve 72 to timer switch 154 through line 140, switch 142, line 144, normally closed switch 148 and line 152. The periodic opening and closing of timer switch 154 will periodically energize and deenergize solenoid valve 72 causing periodic reversals of the position of valve 36 in the manner previously thoroughly discussed. When the temperature of zone A reaches a predetermined maximum temperature, for example 1900° F., switch 148 opens to maintain solenoid valve 72 deenergized and in the spring biased position to cooperate in the centering of valve 36 for by-pass of the incoming gases directly to exhaust pipe 46 as discussed in detail above.

What is claimed is:

1. In an exhaust gas purifier having a zone for the oxidation of exhaust gases comprising a bed of oxidation catalyst the improvement comprising: a bed of heat exchange material on each of two sides of said zone, means for guiding exhaust gases through one bed then through said zone and then through the other bed to preheat the exhaust gases before entering the oxidation zone with one bed and to transfer heat from the oxidized gases leaving the oxidizing zone to the other bed, valve means to reverse the direction of flow through said zone and beds, means responsive to a minimum temperature in said purifier to periodically actuate the valve means to reverse said direction of flow, and means responsive to a predetermined maximum temperature in the purifier to divert the exhaust gases to by-pass said oxidizing zone.

2. A catalytic exhaust gas purifier comprising a housing having an inlet opening and a discharge opening, a catalyst bed mounted in said housing, a bed of heat exchange material on each of two sides of the catalyst bed, means forming a passage leading to each bed of heat exchange material with each passage communicating with the discharge opening, valve means to simultaneously close off one of said passages from the inlet opening and connect it to the discharge opening in a first position and alternately simultaneously connect said one passage to the inlet opening and close the other passage off from the inlet opening and connect it to the discharge opening in a second position, means responsive to a minimum temperature in said purifier to control said valve means to periodically shift it from one of said positions to the other position, and means responsive to a predetermined maximum temperature of the catalyst bed to deactivate the control means and position the valve means to place both passages in communication with both the inlet and discharge openings.

References Cited by the Examiner

UNITED STATES PATENTS

| | | | |
|---|---|---|---|
| 2,898,202 | 8/59 | Houdry et al. | 23—288.3 |
| 2,946,651 | 7/60 | Houdry et al. | |
| 3,086,353 | 4/63 | Ridgway. | |

FOREIGN PATENTS 1,248,627 11/60 France.

MORRIS O. WOLK, *Primary Examiner.*
GEORGE D. MITCHELL, *Examiner.*